May 23, 1939.   S. F. ARBUCKLE   2,159,496
SIGNALING SYSTEM
Filed Feb. 13, 1936
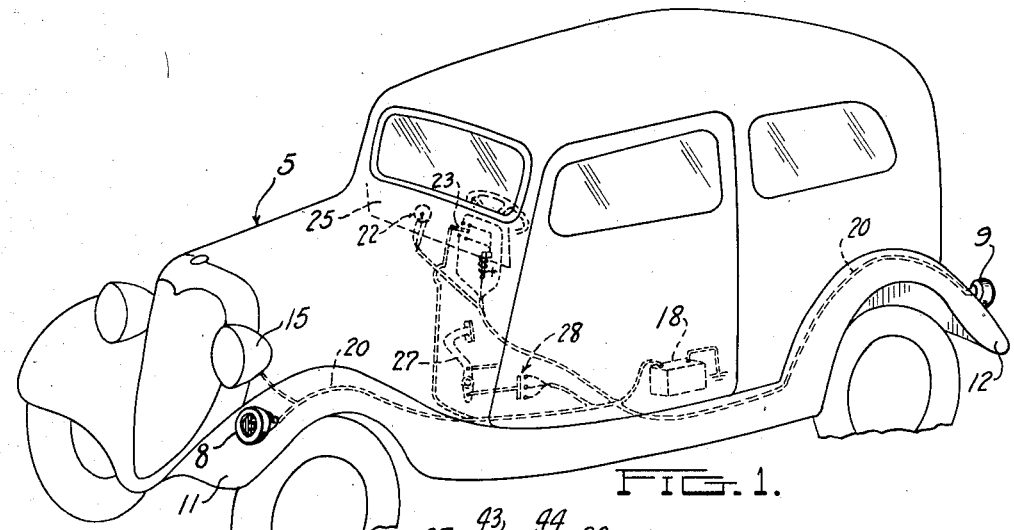
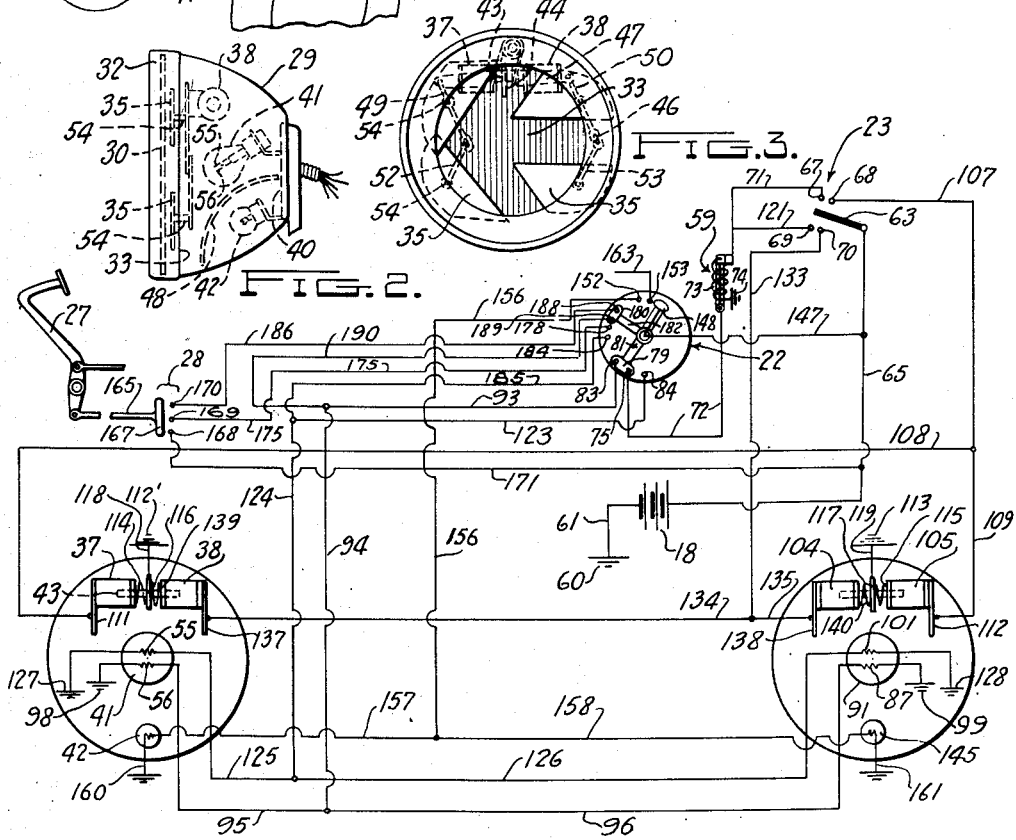
INVENTOR
Samuel F. Arbuckle
BY
Braselton Whitcomb & Davis
ATTORNEYS.

Patented May 23, 1939

2,159,496

UNITED STATES PATENT OFFICE 2,159,496

SIGNALING SYSTEM

Samuel F. Arbuckle, Highland Park, Mich., assignor to United Lens Corporation, Detroit, Mich., a corporation of Delaware Application February 13, 1936, Serial No. 63,759

7 Claims. (Cl. 177—327)

This invention relates to a signaling system and more particularly to means for effectively producing a visible signal.

An object of the invention is to provide an improved signaling system including a plurality of energizable circuits selectively controlled for illuminating signaling devices for night and day use.

Another object of the invention is to provide a system for giving a signal of satisfactory contrasts and sufficient illumination at all times without producing glare.

Another object of the invention is to provide a signaling system including means for periodically emitting a plurality of light rays for visually showing directional caution signals.

A further object of the invention resides in a signaling system for vehicles wherein the intensity of the illumination of the signal is controlled by the lighting system of the vehicle.

A still further object of the invention is to provide a signaling system wherein an efficient illumination is provided whenever the system is in operation with the least consumption of current.

Further objects and advantages are within the scope of this invention such as relate to the arrangement, operation and function of the related elements of the structure, to various details of construction and to combinations of parts, elements per se, and to manufacture and numerous other features as will be apparent from a consideration of the specification and drawing of a form of the invention, which may be preferred, in which:

Figure 1 is a view illustrating the invention as incorporated in an automotive vehicle;

Figure 2 is a side view of one of the signaling devices used in connection with the invention;

Figure 3 is a front view of the signaling device shown in Figure 2 and further illustrating the signal forming mechanism operated to show a directional signal;

Figure 4 is a diagrammatic view of the circuits adapted for use with directional signaling devices.

Referring to the drawing in detail and particularly to Figure 1, the signaling system is shown as incorporated with an automotive vehicle 5 and includes directional signaling devices 8 and 9 secured to the front and rear fenders 11 and 12 respectively. The directional signaling device 8 is located adjacent to one of the headlamps 15. The signaling devices 8 and 9 are connected to the battery 18 by means of cables 20 carrying a plurality of wires for establishing circuit connections controlled through the medium of switches 22 and 23 located in any convenient position such as the dashboard 25 as well as by switch 26 controlled by the brake pedal of the automobile. The circuit connections are diagrammatically illustrated in detail in Figure 4.

One of the signaling devices with which the invention is associated is shown in Figure 2, the same being fully disclosed in copending application, Serial No. 740,400, filed August 18, 1934, therefore for the purpose of describing the present invention, only its essential parts are illustrated and described. The signaling devices includes an outer open ended housing 29 having the open end enclosed by a transparent member 30 supported by means of a rim 32 secured to the housing. Movably supported between the transparent member 30 and a lens 33 are a plurality of indicia members 35, four being shown which may be actuated by energization of the coils 37 and 38 of the electromagnetic structure, particularly shown in Figure 3. The coils 37 and 38 actuate when energized a movable core member 43 having secured at its central portion a disc-like member 44 which is fixedly connected to a flat reciprocating member 47, connected in turn at each end to the pivoted arms 49 and 50. The pivoted arms 49 and 50 are connected by the other respective free end with pivoted arms 52 and 53 by means of a pin and slot connection 46. Each of the arms 49, 50, 52 and 53 rigidly carry at their respective pivotal axis a stub shaft 54 having the other end fixed respectively to each of the indicia forming members 35, in order to simultaneously oscillate the same to produce directional signals to indicate the direction in turning the vehicle. Figure 3 shows the position imparted to the indicia forming members by the mechanism hereinbefore described when the circuit of the coil 37 is energized to attract core 43 thereby moving member 47 which in turn transmits this motion to the pivoted arms 49, 50, 52 and 53 rotating indicia forming member 35 to produce the outline of an arrow pointing to the left.

Carried by the inner surface of the back wall of housing 29 by a suitably insulated current conducting bracket 40 is a lamp bulb 41 which illuminates and projects a plurality of light rays through the areas defined by the indicia forming members located in the forward portion of the housing. Spaced from lamp bulb 41 and supported by bracket 40 is another lamp bulb 42 serving as a tail light signal. A translucent shield 48 made of red pyroxylin or other suitable material is located between lamp bulbs 41 and 42 for the purpose of projecting a red tinted light for a tail light signal.

I have found highly desirable that the light associated with the signaling device should be of different intensities to produce signals which in the day time have a high degree of visibility and at night time are very clear and distinct without producing glaring light which would tend to obliterate the distinguishing characteristics of the signal produced by the signaling devices, and for that purpose the light bulb 41 is provided with filaments 55 and 56 of different light producing intensities. Filament 55, or the low candlepower filament is connected in the system so that its energization takes place at night or under such conditions as when it is necessary to energize the lighting system of the vehicle. Intercalated in the circuits of the filaments 55 and 56 is a periodically operable current interrupting device such as a flasher 59, which not only serves to limit the consumption of current from the battery but provides a flashing warning signal whenever either of the lamp filaments 55 and 56 are energized.

In the embodiment shown, the lens 33 is preferably made of colored tinted glass such as amber or of a color value different from that of the indicia forming members so as to give a better contrast to enhance the visibility of the signaling device to any observer.

Figure 4 illustrates the circuits which cause the energization of the current consuming devices used in the system and include a source of energy such as the battery 18 which has one terminal connected with a ground 60 preferably to the automobile chassis by means of lead 61 to serve as a common return. The other terminal of the battery is connected with the movable member 63 of switch 23 by means of the conductor 65. Positioned adjacent the member 63 are switch contacts 67, 68, 69 and 70 adapted to be engaged thereby. Contact 67 is connected by means of wire 71 to the stationary contact of thermostatic flashing device 59 having a movable arm actuated by the heating coil 73 grounded at 74. The other terminal of the flashing device is connected to a contact 75 of lighting switch 22 by means of lead 72. Contact 75 is adapted to be engaged by a contacting plate 79 carried by movable member 81 of switch 22. Spaced on each side of the contact 75 are contacts 83 and 84 which are so spaced with respect to the width of plate 79 so as to be selectively connected with contact 75, depending on the position of member 81. Contact 83 is connected to one of the terminals of each of the high candle power filaments 56 and 87 respectively of lamp bulbs 41 and 91 by conductors 93, 94, 95 and 96, each of the filaments has the other terminal connected to a suitable ground such as 98 and 99. The stationary contact 84 is connected by means of leads 123, 124, 125 and 126 leading therefrom to the low power filaments 55 and 101 of light bulbs 41 and 91 respectively. The filaments 55 and 101 are provided with connections to grounds 127 and 128 respectively.

The stationary contact 68 of control switch 23 which is adapted to be simultaneously engaged with contact 67 by the switch blade 63 is connected to one terminal of the energizing coils 37 and 105 of the signaling devices 8 and 9 by leads 107, 108, 109 and conducting arms 111 and 112. The other treminal of coils 37 and 105 are connected with suitable grounds 112' and 113 by means of current conducting springs 114, 115, discs 116, 117 and conductors 118, 119 respectively. The contact 69 of switch 23 is connected to the main conductor 71 by means of branch lead 121, thus contact 69 also connects the flashing device or thermostat 59 when the movable arm 63 engages the same. The stationary contact 70 which is adapted to be engaged simultaneously with contact 68 by movable contact 63 is connected to one terminal of the coils 38 and 104 of signal devices 8 and 9 by means of conductors 133, 134, 135 and current conducting arms 137 and 138. The other terminal of coils 38 and 104 is grounded as at 112 and 113 by means of conducting springs 139 and 140, discs 116 and 117 and leads 118 and 119.

The live or ungrounded terminal of battery 18 is also connected to a current conducting blade 148 carried by the movable member 81 of lighting switch 22 by means of leads 65 and 147. The conducting blade 148 is adapted to engage and bridge stationary contacts 152 and 153 whenever conducting plate 79 bridges contacts 75 and 84. The stationary contact 152 is connected by means of leads 156, 157 and 158 to the tail light warning indicators located within the casing of signal devices 8 and 9, which as shown comprise lamp bulbs 42 and 145 having a suitable filament, the other treminal of said filaments being grounded by means of leads 160 and 161 respectively. The stationary contact 153 which is also engaged by blade 148 is connected by lead 163 to the sources of light (not shown) of head lamps 15.

As hereinbefore pointed out, the filaments of each of the lamp bulbs 41 and 91 are also used as means to provide a stop signal for the vehicle. These are also controlled for that purpose by a switch actuated by the brake pedal 27 by means of an insulated member 165 connected thereto, and carrying the movable switch blade 167 adapted to engage stationary contacts 168, 169 and 170 suitably supported adjacent thereto. The contact 168 is connected to the live terminal of the battery by means of lead 171. Contact 169 is connected by means of lead 175 to stationary terminal 178 of lighting switch 22. Stationary contact 170 is connected by means of lead 186 to a stationary contact 188 located in the lighting switch 22 and adapted to be engaged by a contact plate 180 carried by an insulated projection 182 forming part of lighting switch arm 81. Spaced from stationary contact 188 so as to be also engaged by plate 180 is a contact 189 connected by means of lead 190 to conductor 94 which is in turn connected by leads 95 and 96 to the high candlepower filaments 56 and 87 of the lamp bulbs 41 and 91 of the signaling device. Spaced from stationary contact 178 is a contact 184 connected by lead 185 to conductor 124 hence by leads 125 and 126 to one terminal of each of the low candlepower filaments 55 and 101 of lamp bulbs 41 and 91 of the signal devices.

The operation of the system and device incorporated therein can be summarized as follows: During the day or under conditions of good visibility, when no need is present for energizing the head lamps 15, the movable arm 81 of the lighting switch 22 will be in its neutral or normal position as shown in Figure 4, where the conducting plate 79 will be bridging contacts 75 and 83 and the contacting plate 180 will be bridging contacts 188 and 189. If the driver of the vehicle applies the brakes to stop or cause the slowing of the vehicle, the switch blade 167 will move into engagement and bridge stationary contacts 168, 169 and 170, establishing a circuit connection to the high candlepower filaments 56 and 87, thus providing a light of greater intensity of illumination to afford a good contrast and indicate a warning highly visible during the daytime. The circuit established to the flow of current being as follows: From the live terminal of the battery 18 through conductor 171 to stationary contact 168 and by the use of contacting member 167 to stationary contact 170, hence by means of lead 186 to stationary contact 188 through contacting plate 180 to stationary contact 189 and by lead 190 to conductor 94, hence by conductors 95 and 96 to one terminal of each of the filaments 56 and 87 which in turn are connected to grounds 98 and 99, forming a suitable return to the other terminal of the battery by lead 61. Release by the operator of brake pedal 27 will move contacting member 167 out of engagement from stationary contact 168 and 170, thereby interrupting the flow of current.

When the operator desires during the daytime to indicate a caution-directional signal in advance and while driving the vehicle to make a left hand turn, movement of switch blade 63 from the neutral position to a position wherein the same engages contacts 67 and 68 will cause the simultaneous energization of electro-magnetic coils 37 and 105 and also the energization of each of the high candlepower filaments 56 and 87, the circuits for the energization of the electromagnets being as follows: From the live terminal of the battery 18 through lead 65 to movable blade 63 of control switch 23, thence to stationary contact 68 by lead 107 to conductors 108 and 109, to conducting arms 111 and 112 respectively connected to one terminal of each of the energizing windings by spring member 114 and 115 respectively and disk elements 116 and 117 to grounds 112 and 113, forming the return circuit connection to the grounded terminal of the battery. This will cause the flow of current to energize windings 37 and 105 and move the indicia forming member to indicate respectively arrows pointing to the left so that observers looking to the front of the vehicle, as well as the rear, will be apprized of the turn imparted to the vehicle by the driver.

Due to the fact that switch blade 63 is also in engagement with contact 67 a parallel circuit is established for the energization of the high candlepower filaments 56 and 87, including the flashing device 59 connected in the system so that an intermittent flashing warning signal is produced. The circuit for the energization of the filaments being as follows: From contact member 67 by main lead 71 to one terminal of the flashing device, hence through the movable arm by means of lead 72 to stationary contact 75 of the lighting switch 22. The shunt or heating coil 73 of the flashing device adapted to actuate the thermostat for interrupting the circuit is grounded at 74. The stationary contact 75 being connected by contacting plate 79 with stationary contact 83, the latter being connected by lead 93 to conductor 94 and through wires 95 and 96 to one terminal of each of the high candlepower filaments 56 and 87, and hence by means of the return grounds 98 and 99 respectively to the other terminal of the battery. The flashing member 59 is preferably of a type designed to produce rapid interruptions to the flow of current in the circuit so as to provide an intermittent flashing visual signal. Movement of the switch blade 63 to normal position by the operator after the vehicle has completed the turn will open the circuit of the lighting filaments as well as that of the electromagnets, thus allowing the return of the indicia forming member 35 to their normal neutral position by spring 43 where an outline of no directional significance is on display on the casing of the signal device.

If the operator desires during the daytime to indicate a right-hand turn of the vehicle, the switch plate 63 is moved to a position whereby the same engages contacts 69 and 70 to establish parallel circuits to cause the energization of coils 38 and 104 as well as the energization of the high candlepower filaments 56 and 87. The circuit of the filaments is established through the conductors hereinbefore described, as the stationary contact 69 is connected by means of lead 121 to main conductor 71, the other conductors used to cause the energization of the filaments being the same as hereinbefore described when the switch blade 63 was in engagement with stationary contact 67. The circuit established by blade 63 for the energization of coils 38 and 104 being as follows: From the switch blade 63 connected to the live terminal of the battery by means of lead 65 to contact 70 and by lead 133 through wires 134 and 135 respectively to each of the conducting arms 137 and 138 which are connected respectively to one terminal of the windings 38 and 104 and from the other terminals of each of these windings by means of spring members 139 and 140 respectively to disks 116 and 117 to grounds 111 and 112, forming the return circuit to the other terminal of the battery. Thus, the energization of the windings 38 and 104 will cause movement of the indicia forming members to a position whereby the same form an outline of an arrow pointing to the right, whereby observers in the front or rear of the vehicle will be apprized that the driver is making a right-hand turn. Movement to neutral position of the switch blade 63 by the operator when the right hand turn has been effected will open these circuits, allowing that the indicia forming members 35 will be returned to their normal positions by the action of spring 43.

At night or at other times when the operator desires to connect the lighting system of the vehicle, the movable arm 81 and associated element carried therewith is moved counterclockwise from the position shown in full lines to a position where the conducting blade 79 will engage contacts 84 and 85, which cause the engagement by conducting member 180 with stationary contacts 184 and 178 and the engagement of conducting plate 148 with contacts 152 and 153, thus establishing the circuits for energizing the lighting system of the vehicle and the filaments of tail light bulbs 42 and 145. If the operator desires to stop the vehicle, when the lighting system is in operation movement of the brake pedal lever 27 will move the contacting member 167 into engagement with stationary contacts 168, 169 and 170 thereby establishing the energization of the low candlepower filaments 55 and 101. The energization of these filaments is secured by a circuit formed from the live terminal of the battery by lead 171 to stationary contact 168 through movable conducting member 167 to the stationary contact 169, hence by lead 175 to stationary contact 178 through conducting plate in engagement therewith to stationary contact 184 and from the latter by means of wire 185 to lead 124 and hence through conductors 125 and 126 to one terminal of each of low candlepower filaments 55 and 101 which have the other terminal connected to a suitable ground forming the return of the circuit to the other terminal of the battery. Release of the brake pedal 27 will move contacting member 167 out of engagement with the stationary contacts 168, 169 opening the circuit of the filaments 55 and 101 or when the lighting system of the vehicle is in operation by actuating the signal devices.

If the operator desires at night to indicate the turn of the vehicle to the left, it will only be necessary to move the switch blade 63 into engagement with stationary contacts 67 and 68 thereby causing the energization of the coils 37 and 105 as well as the energization of the low candlepower filaments 55 and 101. The circuit established for the energization of the filaments includes from the live terminal of the battery through conductor 65 to switch blade 63, stationary contact 67, hence by lead 71 to flashing device 59, connected by lead 72 to stationary contact 75 bridged by blade 79 with contact 84 which in turn is connected by lead 123 to lead 124 connected by conductors 125 and 126 to one terminal of each of the low candlepower filaments 55 and 101, the other terminal of each of these filaments being connected to suitable grounds to form the return circuit to grounded terminal of the battery 18. Due to the incorporation in the circuit established for the energization of the filaments 55 and 101 of the flashing device 59 it should be noted during the time when switch blade 63 is in engagement with stationary contacts 67 and 68 the circuit of these filaments will be automatically interrupted so that a flashing light will be produced thereby providing an effective warning directional signal indicating the direction of movement of the vehicle.

Movement of the blade 63 in engagement with contact 67 will also engage contact 68 and cause the energization of the coils 37 and 105 to produce an outline of an arrow pointing to the left by establishing a circuit including the conductors mentioned when these coils are energized during daytime operation hereinbefore described.

When the driver of the vehicle has made the left hand turn and wants to stop the indication produced by the directional signal it is only necessary that switch blade 63 be moved out of contact with contacts 67 and 68 to interrupt the flow of current to the low candle-power filaments 55 and 101 so that no light is projected through the light penetrable closure of the signaling device, as well as allowing the indicia forming members 35 to be returned to their normal position by spring 43.

A right hand turn can be indicated by the driver at night through the use of the signaling devices by moving switch blade 63 into engagement with contacts 69 and 70 whereby the low candlepower filaments 55 and 101 are energized, by establishing a circuit incorporating the conductors mentioned when a left hand turn during the night is produced as contact 69 is connected to main lead 71 by conductor 121. The circuit of the electromagnets to actuate the indicia forming members to form the outline of an arrow pointing to the right is produced by the energization of windings 38 and 104, in this instance this circuit includes the conductors used when these coils are energized for daytime operation as has been hereinbefore described. In this case as well as when the switch blade 63 is in contact with stationary contact members 67 and 68, and irrespective of the position of the lighting switch element 81, which controls the intensity of the illumination projected by the signal devices, the energizing circuit for the filaments is intermittently interrupted causing a rapid flashing thereby rendering the warning signals highly effective.

From the foregoing, it can be seen that the movable member 81 and associated parts of the lighting switch 22 controls not only the circuits for energizing the lighting system of the vehicle and tail lamp signal but in addition the intensity of the illumination projected by the signaling devices for producing signals having a high degree of visibility in the day time and sufficient illumination at night without glare. Thus, at night when the lighting system is in operation the switch member 81 intercalates in the system the circuit of the low candlepower filaments 55 and 101 of each of the signaling devices whereby actuation of the switch controlled by the brake pedal 27 or movement of the switch blade 63 to produce directional signals will cause the energization of these filaments if two signaling devices are used, producing signals having clear and distinct characteristics without objectionable glaring effects for indicating not only the stopping of the vehicle but directional caution signals with the least expenditure of current. However, during the daytime or when the lighting system is not in operation, switch member 81 will be in its normal or neutral position, and the circuit of the high candlepower filaments 56 and 87 will be the operative circuit for the signaling system, thus providing means whereby the intensity of illumination projected by the signaling devices is considerably greater than the illumination projects at night, affording a considerable degree of contrast to make the projected signal visible whenever circuits are established by the actuation of the brake pedal 27 or by the switch blade 63 to produce directional signals.

It is apparent that, within the scope of the invention, modifications and different arrangements may be made other than is herein disclosed, and the present disclosure is illustrative merely, the invention comprehending all variations thereof.

What I claim is:

1. A lamp for warning and signal purposes, including, in combination, a housing; a closure therefor having a light penetrable area constituting a direction signal; two energizable light sources having different intensities supported adjacent to said closure; circuits for independently connecting said light sources to a source of current; an intermittently operable circuit interrupting device; and means for establishing an energizing circuit to one or the other of said light sources in series with the intermittently operable circuit interrupting device to project intermittently a light through the light penetrable area of said casing closure.

2. A lamp for warning and signal purposes including, in combination, a housing; a closure therefor having a light penetrable area adapted to define a vehicle direction signal; two energizable sources of illumination confined in a single bulb of different light producing intensities supported adjacent to said closure arranged for illuminating said area; circuits for connecting said sources to a source of current including means for intermittently interrupting the flow of current; manual operable switching means for controlling the circuits of the energizable sources; and means included in said circuit for causing the energization of either of said sources to vary the intensity of illumination of the area defining a vehicle direction signal.

3. A lamp for warning and signal purposes, including, in combination, a housing; a closure therefor having a light penetrable area defining a direction signal; a light bulb; two energizable filaments of different intensities in said bulb adapted to illuminate the area defining a direction signal whereby different intensity of illumination is emitted thereby; a source of current; circuits for connecting said filaments to said source of current for energizing the same including an intermittently operable current interrupting device; means in said circuits for selectively incorporating either of said filaments in an energizing circuit; and means for completing the energizing circuit including one or the other of said filaments to project intermittently a light through the light penetrable area of said casing closure.

4. A signaling device for an automobile, including, in combination, a casing having a light penetrable area; electro-responsive means including light obstructing members located adjacent to said light penetrable area and operable to define outlines of direction signals through which light is projected through said light penetrable area; a plurality of light sources of different intensities cooperating with said electro-responsive means located adjacent to said light penetrable area whereby different intensity of illumination is emitted through the outline formed by said light obstructing members; an intermittently operable current interrupting device; means associated with the lighting system of the automobile to selectively establish an operative circuit for the independent energization of one of said light sources whereby the light projected through the outline formed by the light obstructing members on the light penetrable area is of greater or lesser intensity; and switching means for concurrently energizing said electro-responsive means and causing the operation of the current interrupting device whereby the outlines of the direction signals formed by the light obstructing members are periodically illuminated by the intermittent energization of the light source connected in the operative circuit.

5. A lamp for warning and signal purposes for vehicles, in combination a light penetrable member through which light is emitted to produce signals to indicate vehicle turns; two energizable light sources of different intensities carried by a lamp bulb, each adapted to project light through said light penetrable member whereby different intensity of illumination is emitted thereby; connections between said light sources and a source of current for independently causing the energization of each of said sources; a vehicle lighting switch; means actuated by the lighting switch of the vehicle forming part of said connections whereby the position of the lighting switch selectively controls the energization of either of said light sources; an intermittently operable current interrupting device; and manual switching means for causing the operation of said current interrupting device and energizing the selectively connected light source whereby the light project through the light penetrable member is periodically interrupted.

6. In combination a housing; a closure therefor having a light penetrable area constituting means for giving a vehicle direction signal; independent electrically energizable light sources having different intensities supported adjacent to said closure arranged to illuminate said area at different luminous intensities; circuits for connecting said light sources to a source of current; manual switching means for selectively forming an energizabe circuit with either of said light sources; means actuated by a brake control member of the vehicle for causing a flow of current to energize the selected light source through said selectively formed circuit to project an uninterrupted light through said light penetrable area to indicate a vehicle stop signal; an intermittently operable current interrupting device; and switching means to cause a flow of current controlled by said intermittently operable current interrupting device to the selectively connected light source through said selectively formed circuit to project intermittently a light through said light penetrable area to indicate a vehicle turn signal.

7. A signaling system for vehicles, in combination a casing having an open end; a member closing said end and provided with a light penetrable opening constituting means for giving a direction signal; a plurality of light sources having different intensities located adjacent to said members to illuminate said opening at different luminous intensities; connections for the flow of current to said light sources from a current source; switching means for controlling said connections operable by the switch of the lighting system of the vehicle to selectively control the energization of either of said light sources; periodic circuit interrupting means forming part of said connections; a manual switching means for causing the function of the periodic circuit interrupting means and the energization of the selected light source to produce the periodic illumination of said light penetrable opening; and a second manual switching means for producing the direct energization of the selected light source for causing uninterrupted illumination of said light penetrable opening.

SAMUEL F. ARBUCKLE.